: 
United States Patent [19]

Hansson

[11] 4,104,932

[45] Aug. 8, 1978

[54] EPICYCLIC GEAR TRAINS

[75] Inventor: Hans-Erik Hansson, Finspong, Sweden

[73] Assignee: Stal-Laval Turbin AB, Finspong, Sweden

[21] Appl. No.: 740,522

[22] Filed: Nov. 10, 1976

[30] Foreign Application Priority Data

Nov. 10, 1975 [SE] Sweden .................................. 7512553

[51] Int. Cl.² .......................... F16H 1/28; F16H 57/00
[52] U.S. Cl. ........................................ 74/801; 74/410
[58] Field of Search .............. 74/410, 411, 801, 750 R

[56] References Cited

U.S. PATENT DOCUMENTS

| 1,388,897 | 8/1921 | Schmidt | 74/410 |
| 2,127,463 | 8/1938 | Chilton | 74/801 |
| 2,233,498 | 3/1941 | Taylor | 74/801 |
| 2,543,453 | 2/1951 | Fuller | 74/750 R X |
| 2,749,778 | 6/1956 | Kuhn | 74/801 |
| 3,303,713 | 2/1967 | Hicks | 74/801 |
| 3,776,067 | 12/1973 | DeBruyne et al. | 74/801 |
| 3,943,787 | 3/1976 | Hicks | 74/410 |
| 3,964,334 | 6/1976 | Hicks | 74/801 X |
| 3,983,764 | 10/1976 | Hicks | 74/410 |

FOREIGN PATENT DOCUMENTS

2,361,614  6/1974  Fed. Rep. of Germany.

*Primary Examiner*—Samuel Scott
*Assistant Examiner*—Lance W. Chandler
*Attorney, Agent, or Firm*—Pollock, Vande Sande & Priddy

[57] ABSTRACT

An epicyclic gear train comprises support spindles for the planet or star wheels cantilevered from a single support flange. The cross sections of the spindles vary with distance from the support plate so that under tangential loading the bearing surfaces of the spindles will assume a position essentially parallel to the axis of the gear train.

7 Claims, 2 Drawing Figures

EPICYCLIC GEAR TRAINS

BACKGROUND OF THE INVENTION

In the prior art, the holder for the star or planet wheels of an epicyclic gear train typically comprises two parallel flanges between which the star or planet wheels are journalled on shaft pins. In a planetary gear train, one of these flanges is torque-transmitting since it is connected for rotation with an output shaft; whereas, in a star gear train, the holder is fixedly anchored in the gear housing and torque is transmitted by the inner toothed ring gear of the gear train. In either case, the two flanges are rigidly connected by means of bars; but no matter how strong this connection is made a certain deformation of the planet wheel holder cannot be avoided. Such deformation results in a certain binding or clamping between on the one hand, the planet wheels and, on the other, the shaft pins, sun wheels and surrounding gear ring. In this connection, it should be noted that the various parts of the planet wheel holder cannot be increased in size without limit in order to minimize deformation since the dimensions of the planet wheel holder are constrained by the space available between the different wheels of the gear train.

OBJECTS OF THE INVENTION

An object of the invention is to provide a single flange support for the planet wheels of a planetary gear train.

A further object of the invention is to provide a mounting spindle for such planet wheels which is specially configured to ensure that the planet wheels turn on an axis essentially parallel to the axis of the gear train.

Still another object of the invention is to provide such a mounting spindle having attachment bosses for facilitating installation in proper orientation with such a single flange holder.

These objects are given only by way of example. Thus, other desirable objects and advantages inherently achieved by the invention may occur to those skilled in the art. Nonetheless, the scope of the invention is to be limited only by the appended claims.

SUMMARY OF THE INVENTION

With an epicyclic gear according to the present invention, the holder can be made with a single flange, so that double flanges and bars are completely avoided. In the invention, the planet or star wheels due to their unique construction and mode of attachment to the single holder, compensate for elastic deformations arising in the wheel spindles.

BRIEF DESCRIPTION OF THE DRAWING

The epicyclic gear train according to the invention will be described in more detail with reference to the accompanying drawing, in which.

DETAILED DESCRIPTION OF THE PREFERRED EMBODIMENTS

Figures 1, 2:
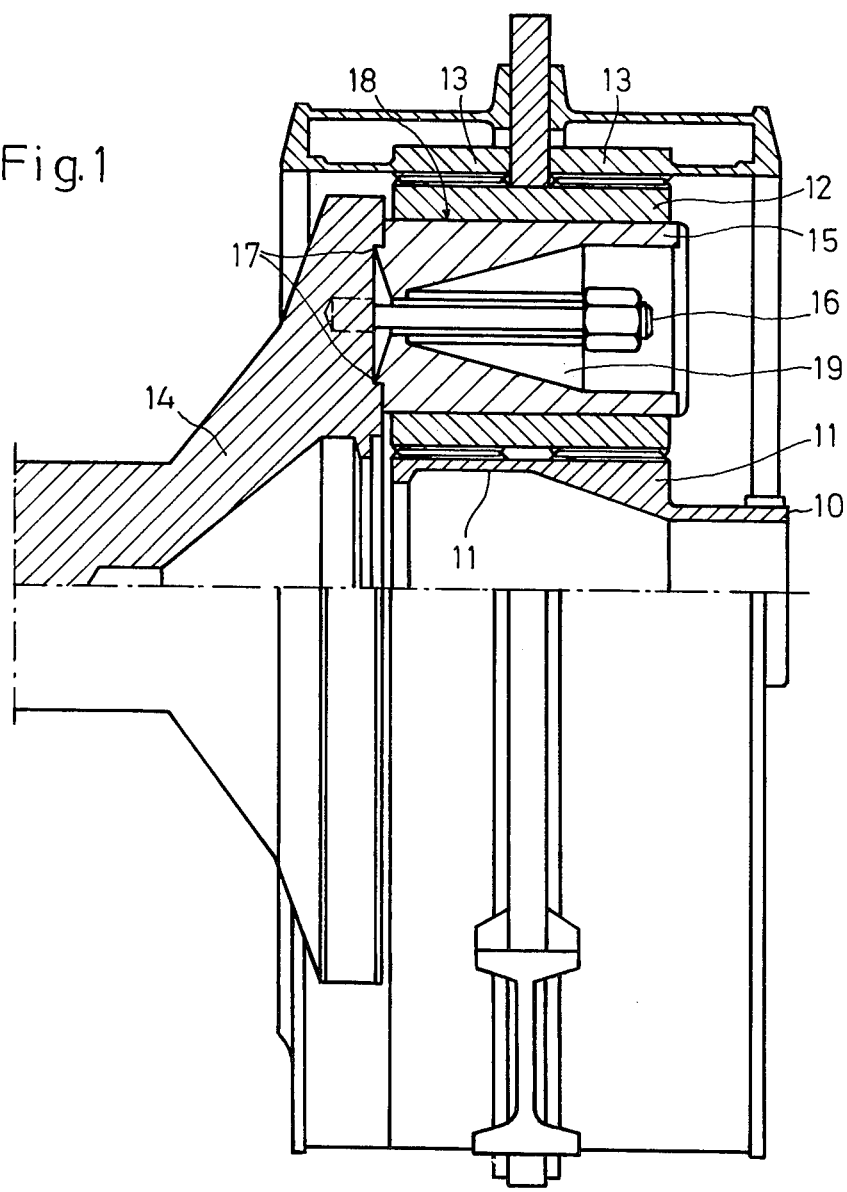
FIG. 1 shows a partially sectional view of an epicyclic gear train according to the invention with a single flange holder.
FIG. 2 illustrates by graphical constructions the geometrical embodiment of a wheel spindle according to the invention indicating cross sections of the planet wheel spindles at their opposite ends.

FIG. 1 shows an epicyclic gear, more specifically a planetary gear having sun wheel shaft 10, sun wheel 11, planet wheels 12 (only one shown), inner toothed rings 13 and a planet wheel holder 14. Each planet wheel 12 rotates on a spindle 15 attached to the holder 14 by means of a set bolt 16 arranged centrally in the spindle. Because of its central positioning the bolt 16 transmits no tangential force, but only axial, attachment force. The tangential force acting on the spindle 15 is taken up by guides 17 arranged in the holder 14. Guides 17 are recesses shaped to receive a correspondingly shaped boss extending from spindle 15 to lock spindle 15 in a fixed orientation relative to holder 14.

Spindle 15 varies in cross section from its end near holder 14 to its outer end so that the shape of bearing surface 18 changes with distance from holder 14. The section is not entirely circular right next to holder 14 as shown at section A in FIG. 2, and gradually tapers outward to become circular as shown at section B in FIG. 2. The cross section axes shown at A and B are preferably tangential to the bolt circle of bolts 16; however, due to rotational forces and possible assymmetry in the gear train, these axes may deviate somewhat from their preferred orientation. The gradually changing cross section of spindle 15 provides compensation for the deformation which would occur if the cross section of spindle 15 were a right circular cylinder extending from unilateral holder 14. Deformation of a right circular cylindrical spindle would result in an unacceptable unbalance of the associated planet wheel and, as a result of the deformation, poor utilization of the bearing surface between the spindle and the planet wheel. For example, if spindle 15 were a right circular cylinder along its entire bearing surface, as indicated by the broken lines in section A, it would be bent by a tangential force F acting parallel to axes A and B on the spindle, so that bearing surface 18 between spindle 15 and the planet wheel 12 would deform approximately as shown by curve $a$, where the line $d$ indicates the center line of the unloaded spindle.

If, on the other hand, the shape of bearing surface 18 of spindle 15 is varied in accordance with the invention, preferably by a linear transition from section A to section B as shown by curve $b$, the deformation caused by tangential forces is compensated. When surface 18 has an unloaded contact surface having the shape of curve $b$, the surface will deform under loading to a curve which closely parallels line $d$ and hence the axis of the gear train itself. Alternatively, a curve according to $c$ can be formed on bearing surface 18 by applying a tangential force F to prestress the work piece during machining of the bearing surface, for example, so that the bearing is better utilized. Curve $c$ would thus be inverse of curve $a$.

The cross section of spindle 15 at section A preferably comprises two circular segments each having a radius of curvature equal to that of the circular cross section at section B. These segments intersect at two diametrically opposed points each spaced from line $d$ a distance slightly less than the radius of the circular cross section at section B, the points also lying in a plane passing through the line $d$ perpendicular to axes A and B. The bearing surface then tapers to the circular shape shown at section B. This taper changes the cross section of the spindle with distance from the holder so that under tangential loading, the side of the spindle supporting the planet wheel will deform and yet have a bearing surface which is essentially cylindrical parallel to the unloaded line $d$ where the spindle bears on the surface. So, depending on the direction of rotation of holder 14, planet wheel 12 rides on one or the other of the two circular segments at section A. Thus, the planet wheels run parallel to line $d$, which minimizes binding or clamping among the various planet wheels, shaft pins, sun wheels and inner toothed gear ring. Of course, other cross sections could be used at section A without departing from the scope of the invention, so long as the bearing surface between the spindle and the planet wheel deforms to be essentially circular and approximately parallel to the line $d$, as taught by this invention.

In FIG. 2 the difference $2\Delta R$ between the dimensions $D_1$ and $D_2$ of the spindle in the two sections A and B has been greatly exaggerated in order to illustrate the principle of the invention. A realistic value for $\Delta R$ is about 1/10 mm when $D_2$ is 200–500 mm.

As shown in FIG. 1, the spindle is further provided with an internal recess 19 having a decreasing diameter towards the part of the spindle which is secured to the holder 14, since the bending stress and thus the deformation will be greater in this part of the spindle. The recess 19 has the effect of decreasing the mass of the spindle with distance from the holder 14.

I claim:

1. An epicyclic gear train, comprising:
   a plurality of planet or star wheels;
   a single flange holder for said wheels;
   a plurality of spindles extending from said holder and supporting said wheels for rotation on said spindles, each of said spindles having an unloaded axis, a first cross section at the end of said spindle adjacent said holder and a second different, cross section at the end of said spindle remote from said holder, each of said spindles also having a bearing surface for supporting said wheels, said bearing surface extending between said first and second cross sections, and the cross sectional area of said spindle gradually changes therebetween whereby as said spindle deforms under tangential loading, said bearing surface between said spindle and its associated wheel deforms until it is essentially parallel to said unloaded axis.

2. Apparatus according to claim 1, wherein said bearing surface tapers linearly from said first cross section to said second cross section.

3. Apparatus according to claim 1, wherein said bearing surface tapers non-linearly from said first cross section to said second cross section.

4. Apparatus according to claim 1, wherein said second cross section is circular and said first cross section has at least two segments of equal radius with said second cross section.

5. Apparatus according to claim 1, wherein each of said spindles is affixed to said holder by means of a set bolt arranged centrally in each of said spindles.

6. Apparatus according to claim 1, wherein said holder comprises guides for receiving said spindles and taking rotary-tangential forces acting on said spindles.

7. Apparatus according to claim 1, wherein said spindle comprises means for reducing its mass as a function of distance from said holder.

* * * * *